(No Model.)
W. W. STALL.
FELLY FOR WHEELS.
No. 509,259. Patented Nov. 21, 1893.
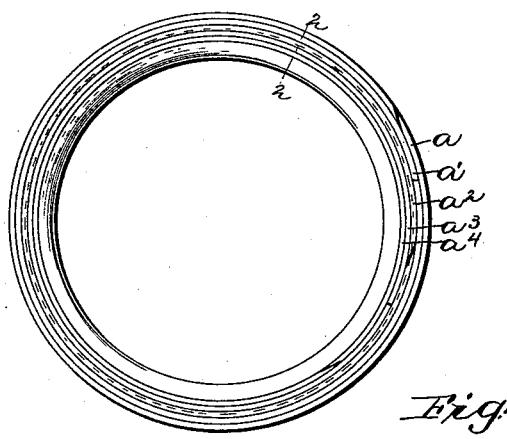
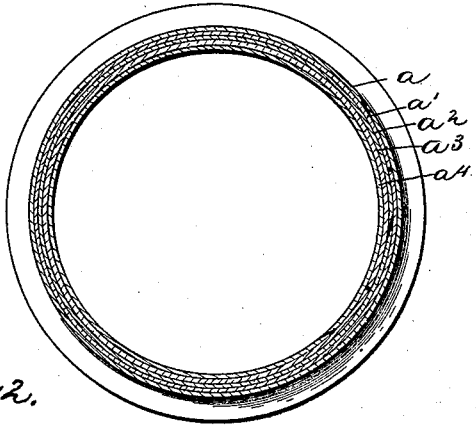
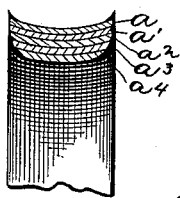
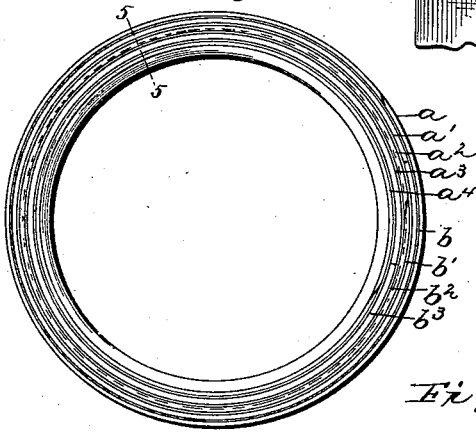
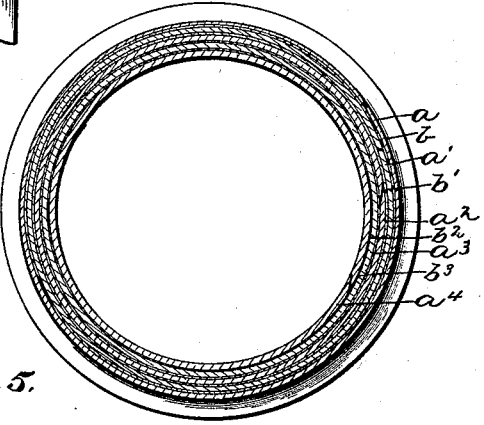
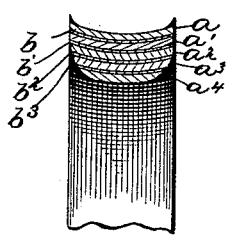
Witnesses
J. M. Fowler Jr.
Chas. F. O'Neill
Inventor
William W. Stall
By
his Attorney

UNITED STATES PATENT OFFICE.

WILLIAM W. STALL, OF BOSTON, MASSACHUSETTS.

FELLY FOR WHEELS.

SPECIFICATION forming part of Letters Patent No. 509,259, dated November 21, 1893.

Application filed June 10, 1893. Serial No. 477,236. (No model.)

*To all whom it may concern:*

Be it known that I, WILLIAM W. STALL, a citizen of the United States, residing at Boston, in the county of Suffolk and State of Massachusetts, have invented certain new and useful Improvements in Rims or Fellies for Wheels; and I do hereby declare the following to be a full, clear, and exact description of the invention, such as will enable others skilled in the art to which it appertains to make and use the same.

This invention relates to that class of rims or fellies for vehicle wheels composed of a number of thin layers or plies of wood coiled one upon another and cemented to form a laminated or composite whole. In the manufacture of such rims or fellies as heretofore practiced said rims have, so far as I am aware, been dressed or finished to their final cross sectional contour after the plies have been coiled and cemented together, such final dressing or shaping involving a considerable cost in time and labor, especially in the manufacture of rims which are crescent shaped cross sectionally, having a peripheral groove or concaved seat to receive a rubber tire. In such crescent shaped rims also, the forming of the peripheral tire groove, aside from the mere cost of time and labor involved has weakened the rim inasmuch as one or more of the outer plies have been cut or grooved out at the center, and has involved an unnecessary waste of the material employed.

The object of this invention is to avoid, wholly or in part, the necessity of imparting cross sectional shape to the rim in a molding, or other suitable machine, and also to avoid the weakening of the rim, and the waste of material, necessitated by cutting away a vital part thereof to give the desired cross sectional contour.

In the accompanying drawings, Figure 1 is a side elevation of a rim embodying my improvements. Fig. 2 is a transverse section on line 2—2 of Fig. 1. Fig. 3 is a section taken through the center of the rim. Fig. 4 is a side elevation of a rim illustrating another feature of my invention. Fig. 5 is a section taken on line 5—5 of Fig. 4. Fig. 6 is a section taken through the center of the rim shown in Figs. 4 and 5.

In constructing rims in accordance with this invention any suitable number of plies, layers or ribbons of wood are coiled, one upon another, or one within another, being properly cemented together during such coiling, the assembled layers or plies being then given the desired cross sectional crescent shape, or approximately so, in any suitably organized machine or press which can be operated to curve such rims cross sectionally by the application of power. While composite rims as at present manufactured might be so shaped, in accordance with my invention, in a suitable press, thus saving considerable of the work required in dressing and shaping, I prefer to specially construct or build up such rims in a manner to be hereinafter explained.

In experimental manufacture I have obtained the best results from the employment of ribbons or layers of wood cut thinner than those ordinarily employed in the manufacture of this class of rims, somewhat in the nature of a veneer, as such stock has less body and is more readily bent transversely in the mold or press without liability of cracking, and moreover such thin ribbons or strips are more completely and readily rendered pliable and yielding from the moisture contained in the glue or cement used in the construction of the rim, or by the application of heat, so that the veneers or stock $a'$ $a^2$ $a^3$ $a^4$ may be bent or shaped into crescent form cross sectionally in the press during the process of construction, or so shaped after all the layers or plies have been coiled or assembled to make a rim of the desired thickness, without the necessity of re-heating or other special treatment.

It is a common practice in making veneer stock for chair bottoms, boats and other articles of commerce to arrange the successive layers or plies with the grain running diversely, in order to prevent warping or cracking, and I propose to avail myself of this plan in constructing wheel rims in accordance with my present invention; thus the ply or layer lettered $a$ in the drawings, would preferably be arranged with its grain running parallel with its edges while the ply lettered $a'$ might be arranged with its grain crossing that of the ply $a$ at a greater or less angle, the ply $a^2$ having its grain arranged parallel with that of the ply $a$, the ply $a^3$ being arranged with its grain running at a right angle to the ply $a'$ and at an angle with the grain of the plies $a$ and $a^2$, and so on. The grain of the outermost or surface ply is preferably, partly for the sake of exterior finish, arranged parallel with the edges thereof, and the intermediate layers, plies or veneers may be arranged at diverse angles with said surface plies throughout the range of one hundred and eighty degrees, the specific arrangement of the plies being left to the experience and good judgment of the manufacturer. It is also my purpose in some cases to incorporate with the wooden plies $a$, $a'$, &c., strips or ribbons $b$, $b'$, &c., of thin stout textile fabric, one of said strips or ribbons being interposed between adjacent plies $a$, $a'$, &c., of wood. This construction gives great transverse strength to the rim, and to the separate plies or veneers composing the rim, and lessens the liability of splitting of said veneers, while imparting the cross sectionally curved shape thereto in the press, or during use as a completed rim. Moreover in using hard wood of fine grain in the manufacture of these composite fellies, such for instance as hickory or ash, the employment of such fabric makes a stronger joint between the plies of wood.

In the manufacture of these rims, I have, so far, secured the best results by shaping the plies or layers separately, the rim or outer layer being coiled within or upon a suitably shaped mold, form or mandrel, then pressed to the desired cross sectionally curved form by suitably constructed devices, the second layer or ply being pressed upon or within the first one, after the two have been coated with a proper cement or glue, and so on.

I prefer, for convenience of manufacture, to build the rim inward from the outer layer or ply $a$ for the reason that the natural spring of the material used tends to keep said outer ply in close contact with the surrounding mold or form, and each succeeding layer or ply in close contact with the next adjacent outer one, and for other reasons which relate to the construction and operation of the coiling apparatus, and unnecessary to recite herein. It will, however, be understood that so far as this present invention is concerned, the rim can be as well built up from the inner ring outward.

What I claim is—

1. The method of making rims or fellies for wheels which consists in successively cementing a number of layers or plies of wood to form a ring or hoop, said successive layers being each in turn subjected to pressure to curve the same transversely and groove said ring or hoop circumferentially, substantially as described.

2. The method of making rims or fellies for wheels which consists in coiling a plurality of alternate layers or ribbons of wood and textile material one upon another to form a ring or hoop, and subjecting said layers or ribbons to pressure to curve the same transversely, substantially as described.

3. A rim or felly for wheels consisting of a plurality of layers or plies of wood coiled and cemented one upon another to form a ring or hoop, said layers or plies being curved transversely to form a groove upon the periphery of said ring or hoop, substantially as described.

4. A rim or felly for wheels consisting of a plurality of layers or plies of wood and textile material arranged alternately coiled one upon another and cemented to form a ring or hoop, said layers or plies being curved transversely to form a peripheral groove in said ring or hoop, substantially as described.

In testimony whereof I affix my signature in presence of two witnesses.

WILLIAM W. STALL.

Witnesses:
I. F. HUNTINGTON,
H. B. LORD.